United States Patent [19]

Moriya et al.

[11] Patent Number: 5,461,602
[45] Date of Patent: Oct. 24, 1995

[54] OPTICAL RECORDING AND REPRODUCING METHOD AND APPARATUS USING LIGHT BEAMS OF TWO DIFFERENT WAVELENGHTS

[75] Inventors: Mitsuro Moriya, Ikoma; Hiromichi Ishibashi, Toyonaka, both of Japan

[73] Assignee: Matsushita Electric Industrial Co., Ltd., Osaka, Japan

[21] Appl. No.: 390,950

[22] Filed: Feb. 21, 1995

Related U.S. Application Data

[63] Continuation of Ser. No. 155,277, Nov. 22, 1993, abandoned, which is a continuation of Ser. No. 757,937, Sep. 12, 1991, abandoned.

[30] Foreign Application Priority Data

Sep. 14, 1990 [JP] Japan ................................. 2-244352
Sep. 18, 1990 [JP] Japan ................................. 2-249429

[51] Int. Cl.$^6$ ............................................. G11B 7/00
[52] U.S. Cl. ............................ 369/116; 369/100; 369/121; 369/54; 369/59; 369/44.38
[58] Field of Search .......................... 369/44.38, 44.37, 369/44.11, 44.32, 44.28, 44.14, 116, 112, 110, 111, 100, 120, 121, 122, 54, 13, 14, 59, 47, 48, 49

[56] References Cited

U.S. PATENT DOCUMENTS

| | | | |
|---|---|---|---|
| 4,670,869 | 6/1987 | Chen | 369/44.38 |
| 4,853,912 | 8/1989 | Akasaka et al. | 369/100 |
| 4,870,508 | 9/1989 | Van Rosmalen et al. | 369/275.1 |
| 5,208,801 | 5/1993 | Finegan | 369/100 |

FOREIGN PATENT DOCUMENTS 53-39123 10/1978 Japan.
59-18771 4/1984 Japan.

OTHER PUBLICATIONS

"Topics", Nikkei New Materials Magazine, Aug. 20, 1990, pp. 23–33 and 60–68. (No English Translation).

Primary Examiner—Scott J. Sugarman
Assistant Examiner—Muhammad N. Edun
Attorney, Agent, or Firm—Wenderoth, Lind & Ponack

[57] ABSTRACT

In an optical recording and reproducing method and an apparatus employed for effecting the method, in a light beam of a wavelength $\lambda 1$ is converted by a laser unit into a light beam having a wavelength $\lambda 2$ which shorter than the wavelength $\lambda 1$ through employment of a wavelength converting element, and the light beams with wavelengths $\lambda 1$ and $\lambda 2$ are converged at approximately the same spots on a recording medium. For recording a signal, a light intensity of the light beam of the wavelength $\lambda 1$ projected onto the recording medium is arranged to be a light intensity for not effecting recording of the signal independently, and recording of the signal is effected through modulation of at least the light beam of the wavelength $\lambda 2$ to be high or low intensity according to the signal to be recorded. For recording or reproducing signals, focus control and tracking control are effected by detecting only the light beam of the wavelength $\lambda 2$ reflected from the recording medium.

4 Claims, 4 Drawing Sheets

OPTICAL RECORDING AND REPRODUCING METHOD AND APPARATUS USING LIGHT BEAMS OF TWO DIFFERENT WAVELENGHTS

This application is a Continuation of now abandoned application Ser. No. 08/155,277, filed Nov. 22, 1993, which in turn is a Continuation of now abandoned application Ser. No. 08/757,937, filed Sep. 12, 1991.

BACKGROUND OF THE INVENTION

The present invention generally relates to optical recording and reproducing, and more particularly, to an optical recording and reproducing method which employs a converting element means for converting a wavelength of a light beam produced from a light source such as a semiconductor laser or the like into a shorter wavelength, and an apparatus employed for effecting said method.

Conventionally, there has been available an optical recording and reproducing apparatus arranged to project a light beam produced from a light source such as a semiconductor laser, etc. and properly converged, onto a disc-like recording medium rotating at a predetermined rotational speed, so as to thereby record a signal onto the recording medium or to reproduce the signal recorded on the recording medium.

On such a recording medium, very fine tracks, e.g. 0.6 μm in width, and 1.6 μm in pitch are formed in a spiral shape or concentric configuration. For recording signals on the recording medium, the intensity of the light beam is modulated to be either high or low, while, for reproducing signals recorded on the recording medium, light reflected from or transmitted through the recording medium is converted into a photoelectric current by a photo-detector.

In the field of the optical recording and reproducing apparatus, it has been a requirement of times to record a large capacity of information on a limited surface of the recording medium. In order to meet such a requirement, it may be so arranged to reduce a spot diameter of the light beam on the recording medium, so as to thereby increase the linear density in the directions of the track pitch and tracks. The light beam spot diameter D on the recording medium is determined by an equation:

$$D = k_\theta \times \lambda / NA$$

where $k_\theta$ is a constant, $\lambda$ is a wavelength of the light beam, and NA is a numerical aperture of a lens converging the light beam onto the recording medium. Accordingly, recording and reproducing of signals at high density become possible, if the wavelength of the light beam is shortened.

As one practice for obtaining a light beam of a short wavelength, there has been known a method in which a solid state laser crystal such as YAG (yttrium-aluminum-garnet) or the like is excited by a light beam such as the semiconductor laser etc., and the light beam generated by the solid state laser crystal is converted into a light beam of a half wavelength through employment of a second harmonic generator (SHG) element (referred to as an SHG element hereinafter). For example, a light beam with a wavelength of 1064 nm is generated by a YAG laser referred to above, and is converted into a light beam of 532 nm by the second harmonic generator (SHG) element (as disclosed, for example, in "Nikkei new materials" magazine, Aug. 20, 1990 issue, pages 32 to 33, and 60 to 68). However, such a practice for obtaining the light beam of a short wavelength has a disadvantage in that it is low in converting efficiency, and for example, even when a semiconductor laser of 809 nm at 100 mW is employed, the light beam of 532 nm is obtained at only about 2 to 3 mW.

On the other hand, in an optical recording and reproducing apparatus, a light intensity of 1 mW or thereabout on the recording medium is sufficient to reproduce the recorded information, but for recording information, a light intensity on the order of from 10 mW to 20 mW on the recording medium is required, and it has been difficult to construct an efficient recording and reproducing apparatus by the known arrangement.

SUMMARY OF THE INVENTION

Accordingly, an essential object of the present invention is to provide an optical recording and reproducing method and an apparatus for effecting said method, which are capable of recording and reproducing signals on a recording medium at high density.

Another object of the present invention is to provide an optical recording and reproducing method and an apparatus for effecting said method as described above which is readily applicable to an optical recording and reproducing apparatus in an efficient manner.

In accomplishing these and other objects, according to one aspect of the present invention, in an optical recording and reproducing apparatus which includes a laser unit for converting a light beam having a first wavelength $\lambda 1$ to another light beam having a second wavelength $\lambda 2$ which is shorter than said first wavelength by a wavelength converting element means, and for also emitting light beams of wavelengths $\lambda 1$ and $\lambda 2$, and a converging lens for converging the light beams of wavelengths $\lambda 1$ and $\lambda 2$ emitted from said laser unit onto approximately the same location on a recording medium, there is provided an optical recording method which includes the steps of arranging a light intensity of the light beam at the wavelength $\lambda 1$ projected onto the recording medium to be a light intensity not effecting recording of a signal independently, and effecting recording of the signal through modulation of at least the light beam having the wavelength $\lambda 2$ to be high or low intensity according to the signal to be recorded.

According to another aspect of the present invention, in an optical recording and reproducing apparatus which comprises a laser unit for converting a light beam having a first wavelength $\lambda 1$ to another light beam having a second wavelength $\lambda 2$ which is shorter than said first wavelength by a wavelength converting element means, and for also emitting light beams of wavelengths $\lambda 1$ and $\lambda 2$, and a converging lens for converging the light beams of the wavelengths $\lambda 1$ and $\lambda 2$ emitted from said laser unit onto approximately the same location on a recording medium, and is arranged to effect recording of the signal through modulation of at least the light beam having the wavelength $\lambda 2$ to be high or low intensity according to the signal to be recorded, there is provided an optical reproducing method which includes the steps of detecting only the light beam of the wavelength $\lambda 2$ as reflected by the recording medium, and for reproducing the recorded signal.

In further aspects of the present invention, it is so arranged to detect only the reflected light of the light beam having the wavelength $\lambda 2$ from the recording medium, so as to thereby effect the focus control and tracking control.

In the optical recording method of the present invention as referred to above, the light beam having the wavelength $\lambda 1$ at such a light intensity as will not record the signal, is projected and the light beam of the wavelength $\lambda 2$ is modulated according to the signal to be recorded for effecting the recording of the signal. Therefore, signal recording may be effected even if the light intensity of the light beam at the wavelength $\lambda 2$ is small, while moreover, since the signal is recorded by the light beam at the wavelength $\lambda 2$ fully converged, recording may be effected at a high density.

Meanwhile, according to the optical reproducing method of the present invention as referred to above, since the signal reproduction is effected by detecting the reflection light of the light beam of the wavelength $\lambda 2$ sufficiently converged, a reproducing signal of a high quality can be obtained. Furthermore, owing to the fact that the focus control and tracking control are effected by detecting only the reflected light of the light beam at the wavelength $\lambda 2$ from the recording medium, not only can a signal of high quality be recorded, but a favorable reproducing signal may also be obtained.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
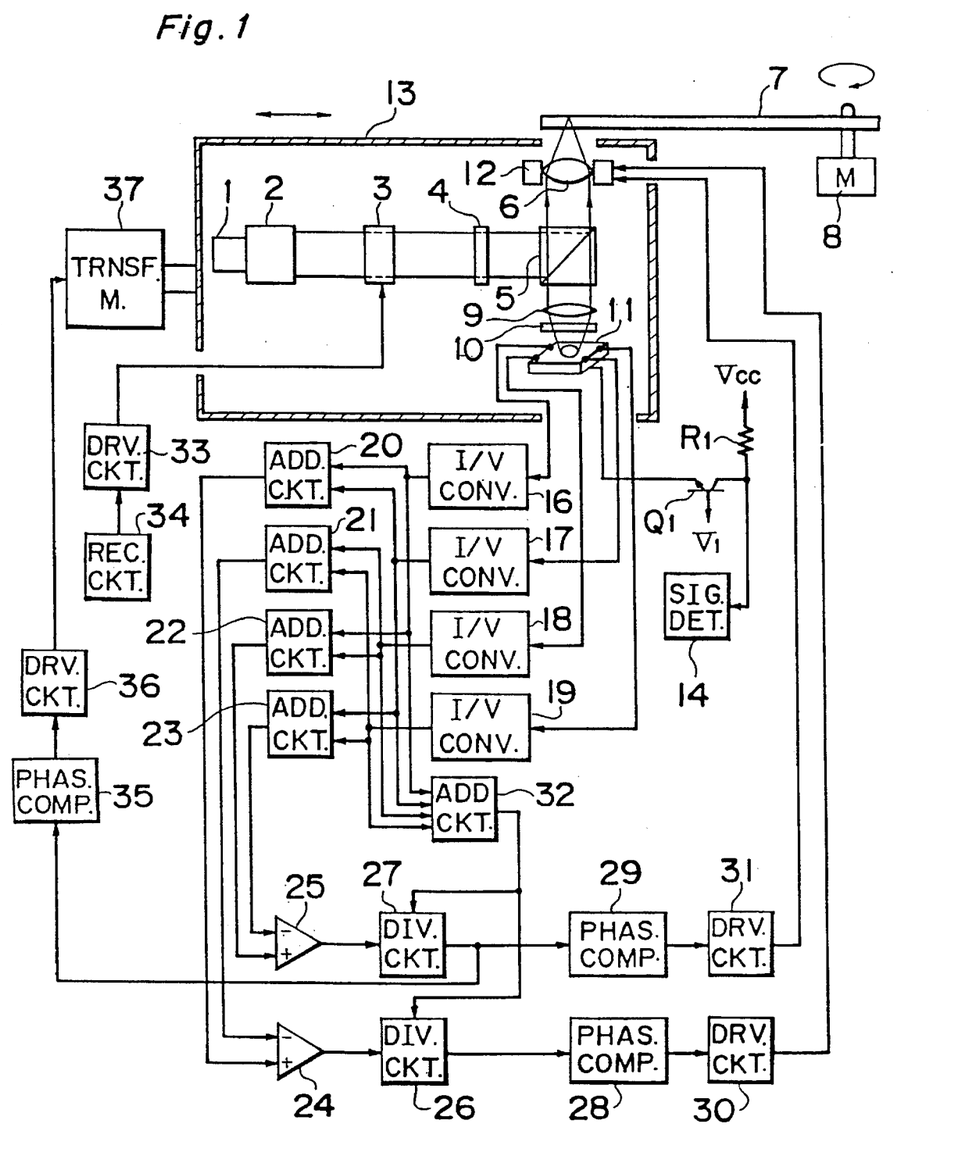
FIG. 1 is a block diagram of an optical recording and reproducing apparatus for explaining an optical recording method and an optical reproducing method according to the present invention.

Referring now to the drawings, there is shown in FIG. 1, a schematic block diagram showing a general construction of an optical recording and reproducing apparatus according to one preferred embodiment and suitable for explaining an optical recording and reproducing method of the present invention.

In the optical recording and reproducing apparatus of FIG. 1, a light beam produced from a light source 1 of a semiconductor laser or the like is incident upon a laser unit 2 which is coupled therewith and emits both a light beam of a wavelength $\lambda 1$ and another light beam having a wavelength $\lambda 2$ converted to be half the wavelength $\lambda 1$, at a predetermined rate. The light beams of the wavelengths $\lambda 1$ and $\lambda 2$ are incident upon a polarized beam splitter 5 by passing them through a photomodulator 3 and transmitting them through a ¼ wavelength plate 4 for the wavelength $\lambda 2$. The polarized beam splitter 5 is provided with a reflecting film which will subject the light beam of the wavelength $\lambda 1$ to total reflection, and therefore, the light beams with the wavelengths $\lambda 1$ and $\lambda 2$ are both reflected by the polarized beam splitter 5 so as to be projected onto a recording medium 7 of a disc-like shape by a converging lens 6.

The recording medium 7 includes a base material formed with a guide track in a spiral shape for guiding the light beam, and a layer of a recording material of a phase change type based on Te and formed on the base material by sputtering, vapor deposition or the like. The recording medium 7 is mounted on a rotating shaft of a motor 8 so as to be rotated at a predetermined speed.

The light beam of the wavelength $\lambda 2$ as reflected by the recording medium 7 is projected onto a photo-detector 11 through a convex lens 9 and a cylindrical lens 10. Meanwhile, the light beam with the wavelength $\lambda 1$ as reflected by the recording medium 7 is reflected by the polarized beam splitter 5, and is not projected onto the photodetector 11. This photo-detector 11 has light receiving regions divided into four sections, and is arranged to detect the converged state of the light beam of the wavelength $\lambda 2$ on the recording medium by the astigmatic method, and also to detect positional deviation between the light beam of the wavelength 2 on the recording medium 7 and the track by the push-pull method. Since the astigmatic method is disclosed in Japanese Patent Publication Tokkosho No. 53-39123, while the push-pull method is disclosed in Japanese Patent Publication Tokkosho No. 59-18771a, detailed description thereof is abbreviated here for the sake of brevity.

The converging lens 6 is mounted on a control element 12, and is adapted to be displaced by said control element 12, in two-axis directions, i.e. in a direction perpendicular to the surface of the recording medium 7, and in a radial direction on the recording medium 7, i.e. in a direction normal to the direction of the track. The light source 1, laser unit 2, photomodulator 3, ¼ wavelength plate 4, polarized beam splitter 5, convex lens 9, cylindrical lens 10, photodetector 11 and control element 12 are mounted on a transfer base 13, which is arranged to be displaceable in the radial direction of the recording medium 7 by a transfer motor 37.

As shown at a right intermediate portion in the block diagram of FIG. 1, one end of a resistor R1 is fixed to a voltage Vcc, with the other end thereof being connected to the collector of a transistor Q1. The base of the transistor Q1 is fixed to a voltage V1 (where V1<Vcc), while the emitter of the transistor Q1 is connected to the cathode of the photodetector 11, which is coupled with current/voltage converting circuits (I/V converting circuits) 16,17,18 and 19 for converting the current into voltage. From the four light receiving regions of the photodetector 11, photo-currents corresponding to light intensity of the light beam being projected thereon are emitted so as to be converted into voltages by the I/V converting circuits 16 to 19. In other words, upon projection of the light beam onto said photodetector 11, the currents are fed to the I/V converting circuits 16 to 19 through the resistor R1, transistor Q1, and photodetector 11. The collector of the transistor Q1 is further connected to a reproduction signal detecting circuit 14 for reproducing the signal recorded on the recording medium, which is arranged to detect the voltage variation caused by the current passing through the resistor R1, thereby to effect reproduction of the signal recorded on the recording medium 7.

The I/V converting circuits 16,17,18 and 19 are coupled with addition circuits 20,21,22 and 23 as illustrated, and the addition circuit 20 outputs the addition of signals of the I/V converting circuits 16 and 17, the addition circuit 21, the addition of signals of the circuits 18 and 19, the addition circuit 22, the addition of signals of the circuits 16 and 18, and the addition circuit 23, the addition of signals of the circuits 17 and 19 respectively. The outputs of the addition circuits 20 and 21 are connected to input of a differential amplifier 24, while the outputs of the addition circuits 22 and 23 are connected to inputs of another differential amplifier 25. The differential amplifier 24 outputs a signal corresponding to a difference of the signals of the addition circuits 20 and 21, i.e. a focus deviation signal corresponding to the converged state of the light beam with the wavelength $\lambda 2$ on the recording medium 7, while the differential amplifier 25 produces a signal corresponding to a difference of the signals of the addition circuits 22 and 23, i.e. a track deviation signal corresponding to a positional deviation between the light beam with the wavelength $\lambda 2$ on the recording medium 7 and the track. The output signal of the differential amplifier 24 is applied to the control element 12 through a division circuit 26, a phase compensation circuit 28 for compensating for the phase of the focus control system, and a driving circuit 30 for power amplification. The control element 12 is arranged to displace the converging lens 6 in a direction perpendicular to the surface of the recording medium 7 so that the converted state of the light beam of the wavelength $\lambda 2$ on the recording medium 7 may be brought into a predetermined state. Meanwhile, the output signal of the differential amplifier 25 is also applied to the control element 12 through a division circuit 27, a phase compensation circuit 29 for compensating for the phase of the tracking control system, and a driving circuit 31 for power amplification. The control element 12 displaces the converging lens 6 in a radial direction of the recording medium 7 so as to position the light beam of the wavelength $\lambda 2$ on the recording medium 7, onto the track. Another addition circuit 32 coupled with the I/V converting circuits 16,17,18 and 19 is adapted to add up the signals of said I/V converting circuits and feeds the added signals to the division circuits 26 and 27. The division circuit 26 outputs the signal corresponding to a value obtained by dividing the signal of the differential amplifier 24 by the signal of the addition circuit 32, while the division circuit 27 outputs the signal corresponding to a value obtained by dividing the signal of the differential amplifier 25 by the signal of the addition circuit 32. Accordingly, for example, even when the light intensity of the light beam of the wavelength $\lambda 2$ is varied, with corresponding variation of the detecting sensitivity of the output signals of the differential amplifiers 24 and 25, the detecting sensitivity of the output signals of the division circuits 26 and 27 is not altered. Therefore, loop gains for the focus control system and tracking control system are held approximately constant at all times, and thus, the control systems become very stable. The control element 12 is displaceable by only about 200 μm in the radial direction of the recording medium 7. Accordingly, the output signal of the division circuit 27 is applied to a transfer motor 37 through the phase compensation circuit 35 and the driving circuit 36 for the power amplification to effect a transfer control so that the control element 12 displaces the natural state towards the center. The phase compensation circuit 35 is intended to compensate for the phase of the transfer control system.

Subsequently, recording of the signal will be briefly described.

The light beam with the wavelength $\lambda 2$ on the recording medium 7 has been converged into a very small spot close to the diffraction limit. On the other hand, the light beam of the wavelength $\lambda 1$ on the recording medium 7 has been converged, at approximately the same position as that of the light beam with the wavelength $\lambda 2$, into a light spot slightly larger than the light spot of said light beam with the wavelength $\lambda 2$. The signal to be recorded is produced from the recording signal generating circuit 34. When the signal is to be recorded, in the state where the focus control and tracking control are functioning, the signal outputted from a recording signal generating circuit 34 is inputted to a driving circuit 33, and the light beams with the wavelengths $\lambda 1$ and $\lambda 2$ are modulated to have a high or low intensity by driving the photomodulator 3 by the driving circuit 33. Since the light beam of the wavelength $\lambda 1$ provides the remaining heat effect, the recording marks may be formed by the light beam of the wavelength $\lambda 2$ at a lower light intensity. Moreover, since the light beam of the wavelength $\lambda 2$ is converged into a small spot, a recording mark of a small size can be formed.

Figure 2:
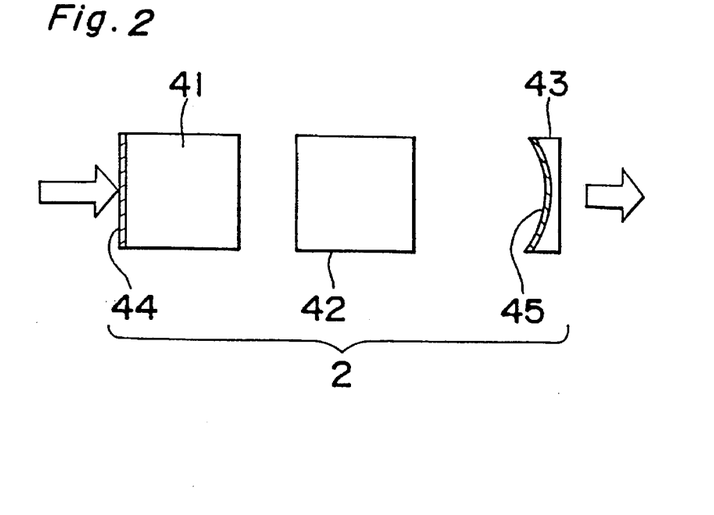
FIG. 2 is a schematic diagram showing the construction of a laser unit employed in the apparatus of FIG. 1.

Referring also to FIG. 2, the laser unit 2 employed in the arrangement of FIG. 1 will be explained.

In FIG. 2, the laser unit 2 generally includes a solid state laser crystal 41 such as a YAG crystal or the like, an SHG (higher harmonic generator) element 42 such as $KNbO_3$, etc., and a reflecting mirror 43.

The light beam emitted from the light source 1 is incident upon an end face 44 of the solid state laser crystal 41 to excite said laser-crystal 41. At this end face 44, there is provided a reflecting film which transmits the light beam produced by the light source 1, and totally reflects the light beams of the wavelengths $\lambda 1$ and $\lambda 2$. Furthermore, on a reflecting face 45 of the reflecting mirror 43, a reflecting film which transmits the light beam of the wavelength $\lambda 1$ at a predetermined rate is provided. Such a reflecting film is, for example, one which reflects 90% of the light beam of the wavelength $\lambda 1$, and transmits 10% thereof. Accordingly, part of the light beam with the wavelength $\lambda 1$, excited by the solid state laser crystal 41 is emitted from the reflecting mirror 43, while being subjected to resonance between the end face 44 and the reflecting face 45. Similarly, the light beam with the wavelength $\lambda 2$ as converted by the SHG element 42 is also emitted from the reflecting mirror 43. In the above embodiment, the filter thin films provided over the end face 44 and the reflecting face 45 are intended to facilitate the manufacture. Since the resonance takes place at the portion where the light beam from the light source 1 is incident upon the solid state laser crystal 41, the filter thin film as referred to above may be provided at least at said portion.

Generally, the light amount $P(\lambda 2)$ of the light beam with the wavelength $\lambda 2$ converted by the SHG element 42 is approximately proportional to the square of the light intensity $P(\lambda 1)$ of the light beam with the incident fundamental wave $\lambda 1$ as represented by a following equation:

$$P(\lambda 2)=k1\{P(\lambda 1)\}^2$$

where k1 is a constant. Therefore, although the light intensity of the light beam with the wavelength $\lambda 2$ is lowered when part of the light beam with the wavelength $\lambda 1$ is emitted from the reflecting mirror 43, on the assumption that, for example, the light beam of higher harmonic wave $\lambda 2$ at 3 mW is generated by the light beam of the wavelength $\lambda 1$ at 100 mW, even when the light beam of the wavelength $\lambda 1$ of 10 mW is emitted from the reflecting mirror 43, the light beam with the wavelength $\lambda 2$ only becomes about 2.4 mW. Therefore, the light beam with the wavelength $\lambda 1$ at 10 mW and the light beam with the wavelength $\lambda 2$ at 2.4 mW can be emitted from the reflecting mirror 43.

Figure 3A:
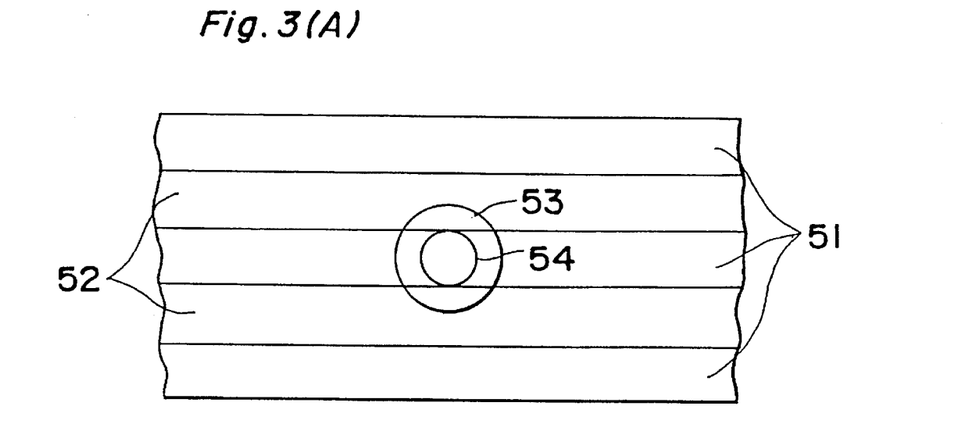
FIG. 3(A) is a fragmentary top plan view showing the configuration of light beam spots on a recording medium.
Figure 3B:
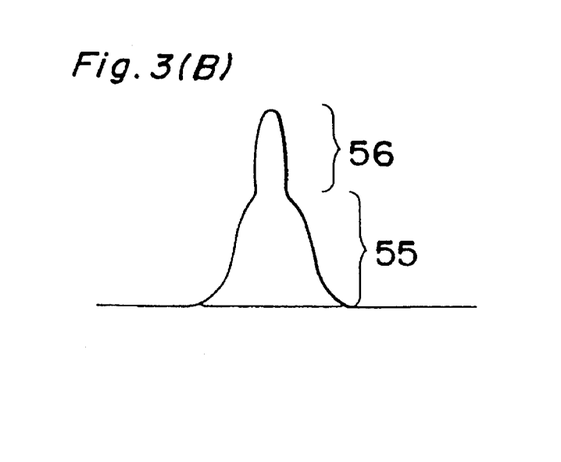
FIG. 3(B) is a graphical diagram for explaining the intensity distribution of a light beam on the recording medium.

Referring further to FIGS. 3(A) and 3(B), the configuration of the light beam spot of the recording medium 7 and intensity distribution thereof will be described hereinafter. In FIG. 3(A) showing a fragmentary top plan view of the recording medium surface, there are provided guide tracks 51 of concave or convex groove-like shape for recording signals, with portions between the tracks i.e. inter-track portions 52 being formed therebetween, while a light beam spot 53 with the wavelength $\lambda 1$ and another light beam spot 54 of the wavelength $\lambda 2$ are respectively shown generally at the central portion. In the graphical diagram of FIG. 3(B) showing intensity distribution of the light beam on the recording medium 7, the abscissa denotes the position, while the ordinate represents the intensity. As shown in FIG. 3(B), the intensity distribution represents the addition of the intensity distributions for the wavelengths $\lambda 1$ and $\lambda 2$, and if roughly divided, numeral 55 represents the intensity distribution for the wavelength $\lambda 1$ and numeral 56 denotes that for the wavelength $\lambda 2$.

As described earlier, the light beam spot diameter D on the recording medium 7 is determined:

$D = k_0 \times \lambda \times NA$, with the spot diameter being reduced as the wavelength becomes shorter. Generally, the refraction index of the material such as glass constituting the converging lens 6 is different according to wavelengths, and therefore, the NA(numerical aperture) of the converging lens 6 also differs according to the wavelengths. Accordingly, it is preferable to prepare the converging lens 6 of a material having a small variation of the refractive index according to the wavelengths. However, there are no materials whose refractive indices are not varied at all by the wavelengths, and the converging points as converged by the converging lens 6 are different for light beams of wavelengths $\lambda 1$ and $\lambda 2$. As explained earlier, the role of the light beam with the wavelength $\lambda 1$ is to assist in the formation of a small recording mark by the light beam of the wavelength $\lambda 2$ with a small light intensity, and it is desirable to effect the focus control so that the beam spot with the wavelength $\lambda 2$ on the recording medium 7 becomes a minimum, and also to effect control so that the beam spot of the wavelength $\lambda 2$ is correctly positioned on the track. For effecting such control, in the embodiment of FIG. 1, it is so arranged to project only the light beam with the wavelength $\lambda 2$ on the photodetector 11 for detection of the focus deviation and track deviation of the light beam of the wavelength $\lambda 2$, so as to thereby effect control based on such detected signals. In connection with the above, resolution of the signal is still more improved when the signal recorded by the small beam spot is reproduced. Owing to the reasons as described above, in the embodiment of FIG. 1, signal reproduction is arranged to be effected by utilizing only the light beam with the wavelength $\lambda 2$.

Hereinafter, the principle of the optical recording will be explained. As materials for the optical recording, the magneto-optical recording material, phase change material and the like are known. For these materials, signal recording is effected through utilization of the heat by the light beam. Therefore, the light intensity of the light beam with the wavelength $\lambda 1$ should not be too large or too small. In other words, if the light intensity of the light beam with the wavelength $\lambda 1$ is too large, a large recording mark is formed, since the signal recording is effected by the light beam with the wavelength $\lambda 1$, whereas if said light intensity is too small, the remaining heat effect is reduced, thus necessitating to increase the light intensity of the light beam with the wavelength $\lambda 2$. Such a requirement as referred to above will be described with reference to FIGS. 4(A) and 4(B).

Figure 4A:
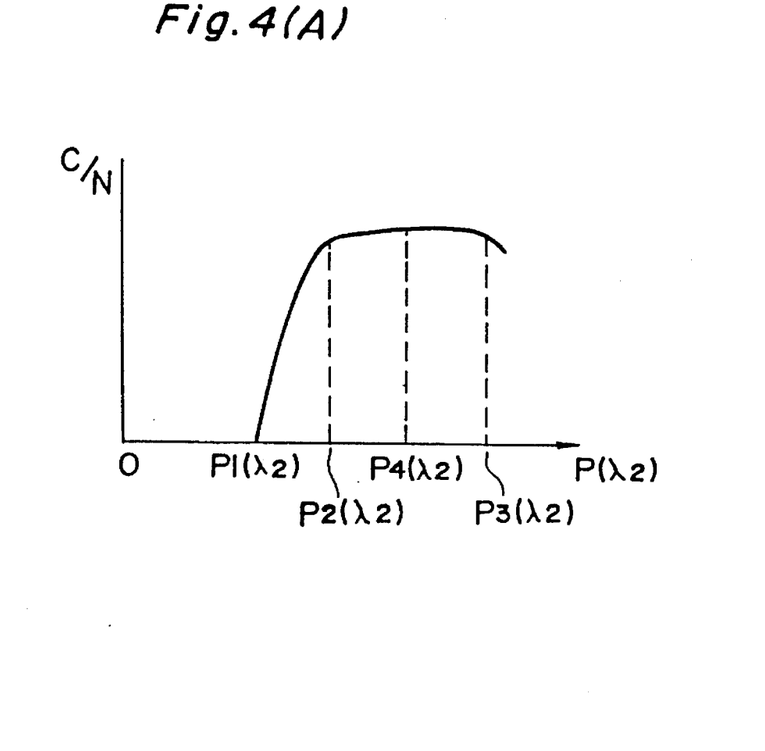
FIGS. 4(A) and 4(B) are graphical diagrams representing relationships between recording light intensities and C/N values for explaining recording characteristics.
Figure 4B:
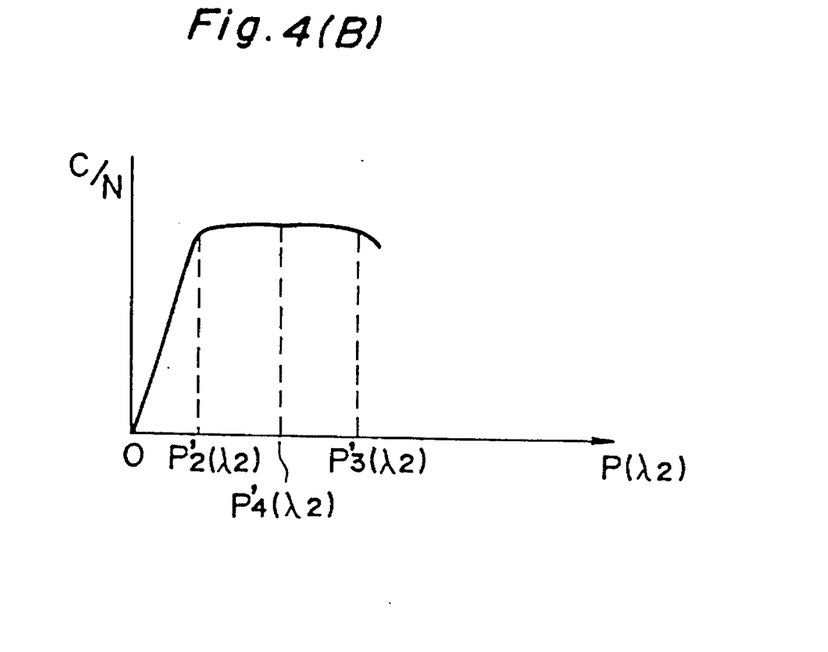

In each of the graphical diagrams of FIGS. 4(A) and 4(B) showing the recording characteristics when the signals are recorded by predetermined beam spots, the abscissa represents the recording light intensity of the light beam, and the ordinate denotes the reproduction amplitude to noise ratio (C/N) when the recorded signal is reproduced.

FIG. 4(A) represents the conventional recording characteristics when the signal is recorded only by the light beam with the wavelength $\lambda 2$. The relationship between the recording light intensity $P(\lambda 2)$ and C/N value is such that when the recording is effected by gradually increasing the light intensity from $P1(\lambda 2)$, the recording mark is recorded to be large and in good quality according to the recording light intensity, and therefore, the reproduction signal amplitude is increased, with improvement of the C/N value. The C/N value becomes generally constant from the light intensity $P2(\lambda 2)$ to $P3(\lambda 2)$. When the recording is effected by the light amount larger than the light intensity $P3(\lambda 2)$, the C/N value is reduced due to reasons such as destruction of the recording material or melting of the base material, etc.

FIG. 4(B) shows the recording characteristics in the case where remaining heat in an amount for barely recording by the light beam of the wavelength $\lambda 1$, i.e. remaining heat equivalent to $P1(\lambda 2)$ in FIG. 4(A) is given so as to record the signal by the light beam of the wavelength $\lambda 2$. As shown, recording is effected by the very small light intensity of the wavelength $\lambda 2$, and the light intensities $P2'(\lambda 2)$, and $P3'(\lambda 2)$ corresponding to $P2(\lambda 2)$ and $P3(\lambda 2)$ as shown in FIG. 4(A) are both lowered in the relationship as follows:

$$P2'(\lambda 2) = \{P2(\lambda 2) - P1(\lambda 2)\}$$

$$P3'(\lambda 2) = \{P3(\lambda 2) - P1(\lambda 2)\}$$

Similarly, the recording light intensity $P4'(\lambda 2)$ of the light beam with the wavelength $\lambda 2$ set in the apparatus will be:

$$P4'(\lambda 2) = \{P4(\lambda 2) - P1(\lambda 2)\}$$

and the light intensity can be made less than that in the case where the light beam with the wavelength $\lambda 1$ is not projected.

The principle for recording the signal on the recording medium 7 is based on the temperature rise produced by projecting the light beam as referred to earlier, and the light intensity per unit area of the light beam projected onto the recording medium 7 relates to the temperature rise. Accordingly, the light intensity $P1(\lambda 1)$ of the light beam with the wavelength $\lambda 1$ equivalent to $P1(\lambda 2)$ in FIG. 4(A), is generally represented as follows:

$$P1(\lambda 1) = P1(\lambda 2) \times (v2/v1) \times (D1/D2)^2$$

where v1 and v2 are absorption coefficients of the light beams of the wavelengths $\lambda 1$ and $\lambda 2$, and D1 and D2 represent the spot diameters of the light beams with the wavelengths $\lambda 1$ and $\lambda 2$ on the recording medium 7.

By way of example, on the assumption that the refractive index of the material for the converging lens 6 is the same by the light beams with the wavelengths $\lambda 1$ and $\lambda 2$, and also, the relationship is v1=v2, $$P1(\lambda 1) = P1(\lambda 2) \times (\lambda 1/\lambda 2)^2$$

and when $\lambda 2 = 2\lambda 2$, $$P1(\lambda) = 4P1(\lambda 2).$$

In other words, when the wavelength is doubled, four times the light intensity required. Accordingly, the transmittance of the filter thin film at the end face 43 in FIG. 2 may be set so that, when the light intensity of the light beam of the wavelength λ2 shown in FIG. 4(B) becomes P4'(λ2) on the recording medium 7, the light intensity P1(λ1) of the light beam with the wavelength λ1 is projected on the recording medium 7. More specifically, the transmittance k2 of the filter thin film at the end face 43 in FIG. 2 may be set so as to satisfy the following equations.

$$P4'(\lambda 2) = k1 \times \{(1-k2) \times P1(\lambda 1)/k2\}^2 \therefore k2 = 1/[1+\{1/P1(\lambda 1)\} \times \{P4'(\lambda 2)/k1\}^{1/2}]$$

As described earlier, although FIG. 4(B) relates to the case where the light beam of the wavelength λ1 with the light intensity at P1(λ1) is projected, it is preferable to set at a light intensity less than P1(λ1), owing to the reason that the light intensity with the wavelength λ1 is considered to be changed by temperature or with time, and it is intended not to record by the light beam of the wavelength λ1 even when the light intensity of the light beam with the wavelength λ1 is altered by the above factors. For realizing such function, it may be so arranged to set the transmittance of the filter thin film of the end face 43 smaller than a value obtained by the above equation.

Figure 5:
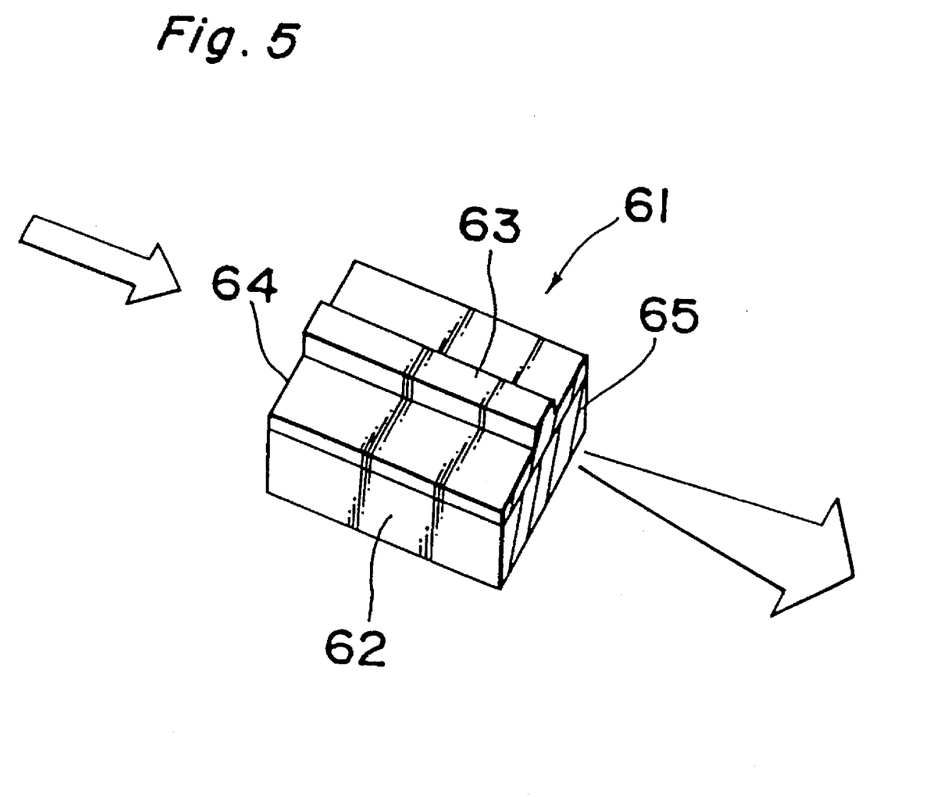
FIG. 5 is a schematic perspective view showing a general structure of an SHG element which may be employed for the present invention.

Referring further to FIG. 5, there is shown a schematic diagram showing general construction of an SHG element 61 for directly converting the light beam generated from the light source 1, which SHG element 61 may be applied to the present invention.

In FIG. 5, the SHG element 61 generally includes a substrate 62 constituted by LiTaO$_3$ and a waveguide 63 made of LinbO$_3$, with filter thin films being provided on opposite end faces 64 and 65 of said SHG element 61. More specifically, at the end face 64 upon which the light beam from the light source 1 is incident, the thin film having the characteristic to transmit the light beam with the wavelength λ1 generated from the light source 1, and to reflect the converted light beam with the wavelength λ2 is provided. Meanwhile, at the end face 65 for emission, the thin film having the characteristic to allow the light beam with the wavelength λ1 to pass at a predetermined rate is provided. Therefore, from the end face 65 of the waveguide 63 for the SHG element 61, the light beam of the wavelength λ1 at the predetermined rate and the converted light beam of the wavelength λ2 are emitted. In the embodiment of FIG. 5, although the filter thin films provided on the end faces 64 and 65 are formed over the entire surfaces of said end faces for facilitation of manufacture, such filter thin films may be provided at least on the opposite end faces of the waveguide 65, since the light beam is incident upon the waveguide 63 from the end face 64 and is emitted therefrom at the side of the end face 64. For applying the SHG element 61 of FIG. 5 to the embodiment of FIG. 1 described earlier, it may be so arranged to employ a semiconductor laser for the light source 1, with the photomodulator 3 being omitted, so as to modulate the current of the semiconductor laser according to the signal to be recorded.

It should be noted here that the foregoing embodiment of the present invention may be modified in various ways within the scope.

For example, in the embodiment of FIG. 1, although both of the light beams with the wavelengths λ1 and λ2 are modulated to be high or low intensity according to the signal to be recorded, it may be so modified to modulate only the light beam of the wavelength λ2 without modulating the light beam with the wavelength λ1. Meanwhile, the reason for employing the modulator 3 is such that, since a resonator is provided in the laser unit 2, the light beam from the reflecting mirror 43 is not modulated even when the light beam of the light source 1 is modulated by the high frequency. Accordingly, in the case where the signal of a low frequency is to be recorded, it may be so arranged to omit the modulator 3 so as to modulate the light beam generated from the light source 1. In this case, the semiconductor laser is used for the light source 1, and the current of said semi-conductor laser may be modulated according to the signal to be recorded.

Moreover, a reflecting film for reflecting the light beam with the wavelength λ1 may be provided on the surface of the photodetector 11 so that the light beam of the wavelength λ1 is not detected more perfectly.

Furthermore, the present invention may also be applied to an optical recording and reproducing apparatus for reproducing the signal recorded on the recording medium by light transmitting through the recording medium.

The present invention may be applied to discs employing magneto-optical materials or organic color materials instead of the phase change material, and apparatuses for such discs. Additionally, the shape of the recording medium is irrelevant, and may be, for example, in the form of a tape.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed being included therein.

What is claimed is:

1. An optical recording method for recording information on a recording medium by projecting a converged light beam radiated from a wavelength converting element for converting a light beam with a wavelength λ1 into light beam with a wavelength λ2 shorter than the wavelength λ1, onto the recording medium through converging, and modulating the intensity of the light beam with the wavelength λ2 according to information to be recorded so as to record the information on the recording medium, said optical recording method comprising the steps of:

radiating the light beams with the wavelengths λ1 and λ2 from the wavelength converting element;

converging and projecting said two light beams with the wavelengths λ1 and λ2 onto approximately the same place on the recording medium so that the beam spot of the wavelength λ2 becomes smaller than the beam spot of the wavelength λ1 and, during recording of the information, making light intensities of both the light beams of the wavelengths λ1 and λ2 shorter than the light intensities thereof during reproduction, and setting the intensity of the light beam with the wavelength λ1 at a level incapable of recording information singly, and modulating the light intensity of the light beam of the wavelength λ2 to be strong or weak according to the information to be recorded, wherein insufficiency in temperature rise on the track on the recording medium due to the intensity of the light beam with the wavelength λ2 is supplemented by the intensity of the light beam with the wavelengths λ1 to effect recording of the information.

2. An optical recording and reproducing apparatus for recording information on a recording medium by converting and projecting a light beam onto the recording medium or to reproduce the information recorded on the recording medium, said optical recording and reproducing apparatus comprising:

a wavelength converting means for converting a light beam of a wavelength $\lambda 1$ as generated from a semiconductor laser into a light beam having a wavelength $\lambda 2$ shorter than the wavelength $\lambda 1$, and also emitting both of the light beams of the wavelengths $\lambda 1$ and $\lambda 2$;

a converging means for converging the light beams of the wavelengths $\lambda 1$ and $\lambda 2$ as emitted from said wavelength converting means onto approximately the same location of the track on the recording medium so that the beam spot of the beam with a wavelength $\lambda 2$ becomes smaller than the beam spot of the beam with a wavelength $\lambda 1$; and a light intensity modulating means for making, during recording of the information the light intensities of both the light beams with the wavelengths $\lambda 1$ and $\lambda 2$ stronger than those during reproduction, setting the light intensity of the light beam of the wavelength $\lambda 1$ at a level incapable of recording information singly, and for modulating the intensity of the light beam of the wavelength $\lambda 2$ to be strong or weak according to the information to be recorded, wherein recording of information is effected by supplementing insufficiency in the temperature rise on the track of the recording medium due to the intensity of the light beam of the wavelength $\lambda 2$ by the intensity of the light beam of the wavelength $\lambda 1$.

3. An optical recording and reproducing apparatus as claimed in claim 2, further comprising:

a separating means for separating the light beam of the wavelength $\lambda 2$ as reflected by the recording medium;

an optical detecting means for converting the light beam of the wavelength $\lambda 2$ as separated by said separating means into an electrical signal; and a reproducing means for reproducing the signal recorded on the recording medium from the signal of said optical detecting means.

4. An optical recording and reproducing apparatus as claimed in claim 2, further comprising:

a first displacing means for simultaneously displacing converging points of the light beams of wavelengths $\lambda 1$ and $\lambda 2$ on the recording medium in a direction perpendicular with respect to the surface of said recording medium;

a second displacing means for displacing converging points of the light beams of wavelengths $\lambda 1$ and $\lambda 2$ on the recording medium so as to cross tracks on said recording medium;

a separating means for separating the light beam of the wavelength $\lambda 2$ as reflected by the recording medium;

an optical detecting means for converting the light beam of the wavelength $\lambda 2$ as separated by said separating means into an electrical signal;

a focus deviation detecting means for detecting a focus deviation of the light beam of the wavelength $\lambda 2$ being projected onto the recording medium, using the output signal of said optical detecting means;

a track deviation detecting means for detecting a positional deviation between the light beam of wavelength $\lambda 2$ as converged on the recording medium and the track;

a first control means for driving said first displacing means according to a signal from said focus deviation detecting means, and for controlling said first displacing means so that the light beam of wavelength $\lambda 2$ projected onto the recording medium is brought into a predetermined converged state; and a second control means for driving said second displacing means according to a signal from said track deviation detecting means, and for controlling said second displacing means so that the light beam of wavelength $\lambda 2$ is converged onto the recording medium so as to be positioned on the track.

\* \* \* \* \*